Aug. 16, 1966 R. E. BRAUN 3,267,453

TAPE LEVEL INDICATING APPARATUS

Filed Nov. 20, 1963 3 Sheets-Sheet 2

INVENTOR.
ROBERT E. BRAUN
BY
William R. Nolte
AGENT

Aug. 16, 1966 R. E. BRAUN 3,267,453

TAPE LEVEL INDICATING APPARATUS

Filed Nov. 20, 1963 3 Sheets-Sheet 3

INVENTOR.
ROBERT E. BRAUN
BY
William R. Nolte
AGENT

United States Patent Office 3,267,453
Patented August 16, 1966

3,267,453
TAPE LEVEL INDICATING APPARATUS
Robert E. Braun, Philadelphia, Pa., assignor to Burroughs Corporation, Detroit, Mich., a corporation of Michigan
Filed Nov. 20, 1963, Ser. No. 324,995
4 Claims. (Cl. 340—259)

The present invention relates to tape level sensing apparatus, and in particular to tape level sensing apparatus which is capable of providing an indication that the tape supply is adequate for a given tape utilization operation or needs replenishing.

The present tape level sensing apparatus may be used in conjunction with tape perforator recording apparatus which may be capable of accepting coded data from digital computers at a high rate of speed and producing a perforated paper or record therefrom. When such perforator apparatus is used in a computer subsystem as part of a space guidance tracking system, for example, a normal complement of tape must be provided which is capable of recording at a continuous rate for a predetermined period of time. In one mode of operation, when the tape supply is adequate for recording during said predetermined period, the apparatus of the present invention is capable of providing visual indication in the form of a light on the remote control panel corresponding to said adequate supply. When the tape falls below an adequate supply, the tape level sensing apparatus will sense the change and provide a different visual indication to the operator. The minimum required tape level may be remotely set by the operator to anyone of a plurality of tape levels.

Heretofore, one form of tape level sensing apparatus, capable of indicating only a single tape level, employed a tape sensing arm mounted on a stationary cabinet structure, while the spool of tape and its mounting chassis were allowed to pivot about a fixed point to provide proper tape feed tension. The accuracy of such supply indication was inherently poor because the chassis carrying the supply of tape moved away from the sensing arm affixed to the stationary member. In addition, the vibration imparted to the tape supply reel was reflected in a bounce of the tape sensing arm thereby increasing the magnitude of errors induced in the sensing arm in such an arrangement.

It is an object of this invention therefore to provide an improved tape supply sensing apparatus which avoids one or more disadvantages of the prior art arrangements and which has improved sensitivity and accuracy.

It is a further object of this invention to provide improved sensing apparatus capable of emitting an electrical output at each of a plurality of discrete tape levels.

In accordance with the invention, a reel having a supply of tape thereon may be mounted for rotation upon a chassis which in turn, is mounted for pivoting action to provide proper tape feed tension. Sensing arm means carried by the chassis are provided to follow the peripheral surface of the spool of tape to thereby sense changes in its diameter. As the tape winds off the spool decreasing its diameter, the sensing arm means which are pivoted to the chassis move a corresponding amount. The sensing arm means include a plurality of cam edge surfaces which engage a plurality of switch means disposed about the periphery of the sensing arm means in various positions of movement of the latter. The switch means may be wired in a manner to provide visual indications representative of the tape footage remaining upon the supply reel. Stop means are provided to limit the movement of the sensing means when the supply of tape on the reel is diminished beyond its lower limit.

For a better understanding of the present invention, together with other and further objects thereof, reference is had to the following description taken in connection with the accompanying drawings, and its scope will be pointed out in the appended claims.

In the drawings:

FIGURE 1 is a rear elevation view of the apparatus disposed behind the front face of a cabinet and embodying the present invention;

FIGURE 4 is a circuit diagram embodying the switches employed in the apparatus of this invention.

Figure 2:
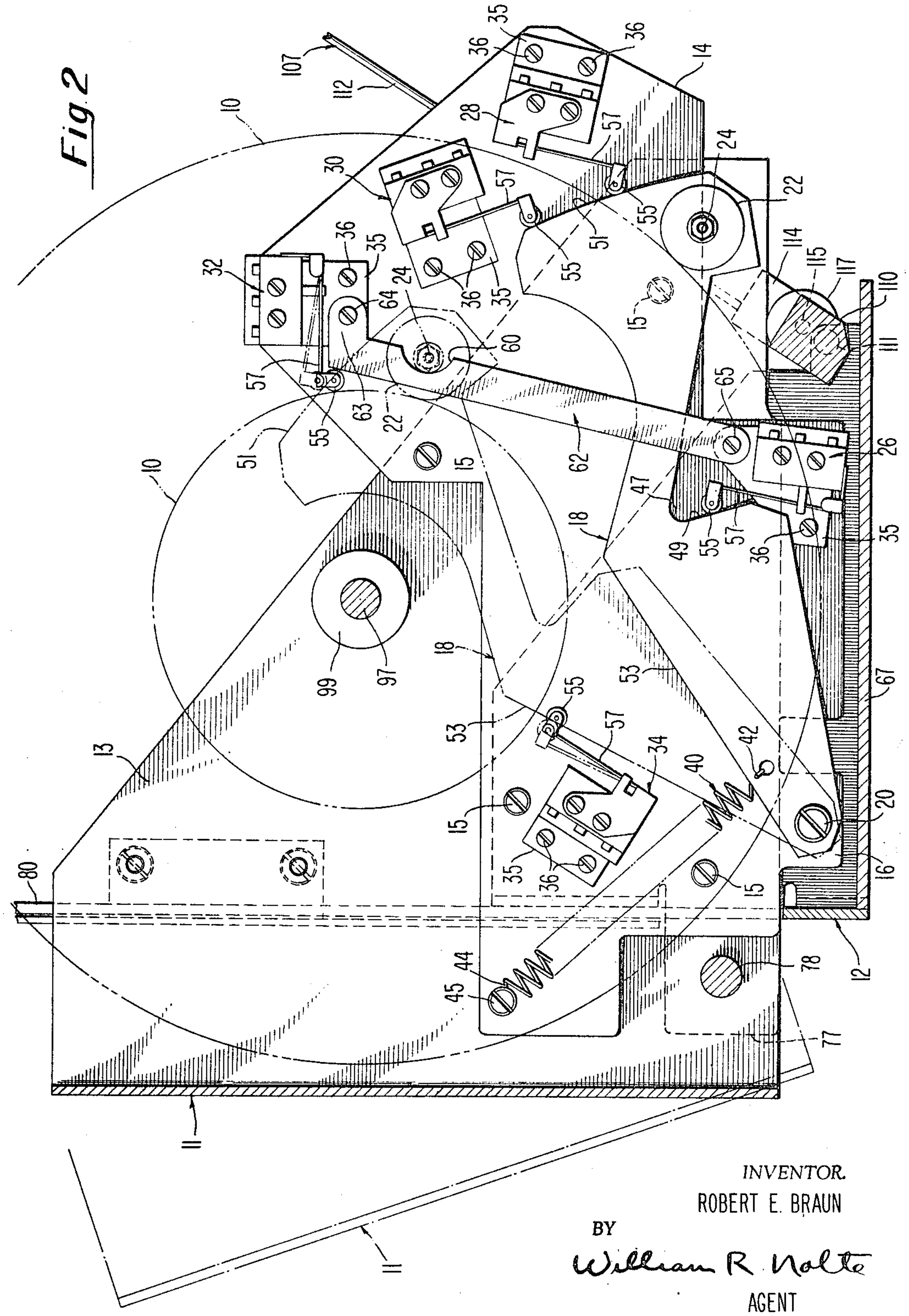
FIGURE 2 is a sectional view taken along the line 2—2 of FIGURE 1.

Referring now to FIGURES 1 and 2 of the drawing, there is shown a tape level sensing apparatus embodying this invention. A supply of tape 10 is shown received within a housing 11 which is mounted for pivotal movement relative to the front stationary panel 12 of suitable tape utilizing equipment. The housing 11 is in the form of a channel member and includes a first flange 13 thereof upon which is secured a mounting plate 14 as by screws 15. The latter mounting plate 14 includes, as seen in FIGURE 2, a tongue or tab portion 16 depending from its lower edge surface to which is pivotally mounted a movable contact arm 18 as by pivot 20. A follower roller 22 is secured by means of shaft 24 to the free end of the contact arm in a manner to engage the outer peripheral surface of the supply of tape 10 to thereby sense changes in its diameter.

To accomplish this purpose a plurality of switch assembly means 26, 28, 30, 32 and 34 are disposed about the periphery of contact arm 18 to make successive contact therewith as the same is pivotally moved about pivot 20. Each of the aforementioned switch assembly means include a switch supporting plate 35 which may be adjustably secured by means of screws 36 to the mounting plate 14. Bias means in the form of a spring 40 is effective to normally urge the contact arm 18, carrying follower roller 22, into engagement with the outer surface of the tape 10. One end 42 of the spring is hooked into engagement with the contact arm while the other end 44 thereof is anchored to the mounting plate as by threaded bolt 45. The spring 40 operating in tension is effective to urge the follower roller 22 upwardly in a counterclockwise direction to follow the diminishing diameter of the tape 10 as the latter is unreeled by means not shown.

As is clearly seen in FIGURE 2, contact arm 18 is generally of elongated form and includes a notched portion as at 47 along its lower edge surface to define a cam surface 49 along a margin of the notch. The contact arm further includes a cam edge 51 adjacent the follower roller 22, and an additional cam surface along its top edge as at 53 forward of the spring 40. Roller 55 mounted on spring arm 57 of switch 26 is shown in contact with camming surface 49 of contact arm 18. In a similar manner the roller 55 carried on spring arm 57 of each of the switches 28 and 30 are shown in an actuated position by the sam surface 51. As the contact arm 18 is moved upwardly in a counterclockwise direction from its full line position thereof, the camming surface 51 will disengage switches 28 and 30 and engage the roller and spring arm of switch 32 to trip the same. When the tape supply is diminished so that the contact arm moves to its upper dotted line position, camming surface 53 will engage the roller of switch 34. When in this upper position as shown, the shaft 24 carrying follower roller 22 is received in the notch 60 of stop 62 to restrain the contact arm from further counterclockwise movement. The stop being generally strip-like in form, includes an upper transverse extremity 63 which is secured by screw 64 and is fastened at its lower end as by screw 65 adjacent switch 26. The stop member 62 is spaced a distance from the mounting plate 14 and is effective to guide the travel of contact arm 18 along a generally vertical plane.

As previously stated, it was indicated that the channel shaped housing 11 which carries the supply of tape 10 is mounted for pivotal movement. This enables tape carried thereby to be properly tensioned and additionally facilitates replenishing the supply of tape upon exhaustion of the same. With reference to FIGURES 1 and 2, there is shown a horizontally disposed channel member 67 having upstanding flanges 68, 69. Each of the latter upstanding flanges include transversely extending upper and lower tabs 71, 73 secured to the rear surface of the front stationary cabinet panel plate 12 by bolts 75. The lower forward portion of the channel member includes a pair of ears 77 which carry housing 11 by means of pin 78 which passes through said ears and the flanges of the housing. Forward and downward motion of the housing 11 about the pivot pin 78 and through aperture 80 in the front stationary plate 12 as seen in FIGURE 2, enables replacement of the supply of tape 10.

Referring now to FIGURE 1, it is noted that the supply of tape 10 is carried upon a split reel assembly 82. The left hub portion 83 of the reel is secured to shaft 84 which is received in bearing 85 suitably supported upon flange 87 of housing 11. The leftmost end of the shaft carries a wheel 89 which engages a friction block 91 supported upon transverse tab 92 integral with upstanding flange 68 of channel member 67. The right hand hub portion 95 of the reel is likewise suitably affixed to a stub shaft 97 coaxially aligned with shaft 84 and suitably mounted for rotation in the opposite upstanding flange 13 of housing 11 by bearing means 99. A thumb knob 100 affixed to the right hand end of the shaft enables the right hand hub portion 95 of the reel to be moved to its dotted line position against the force of spring 101 encircling the shaft thus enabling the supply of tape to be changed or replenished by insertion between the hub halves. When so moved, the shaft 97 slides transversely of bearing 99 and the spring 101 is compressed by engagement of one of its ends adjacent the hub portion 95 and its other end which bears directly against the flange 13 of housing 11.

Figure 3:
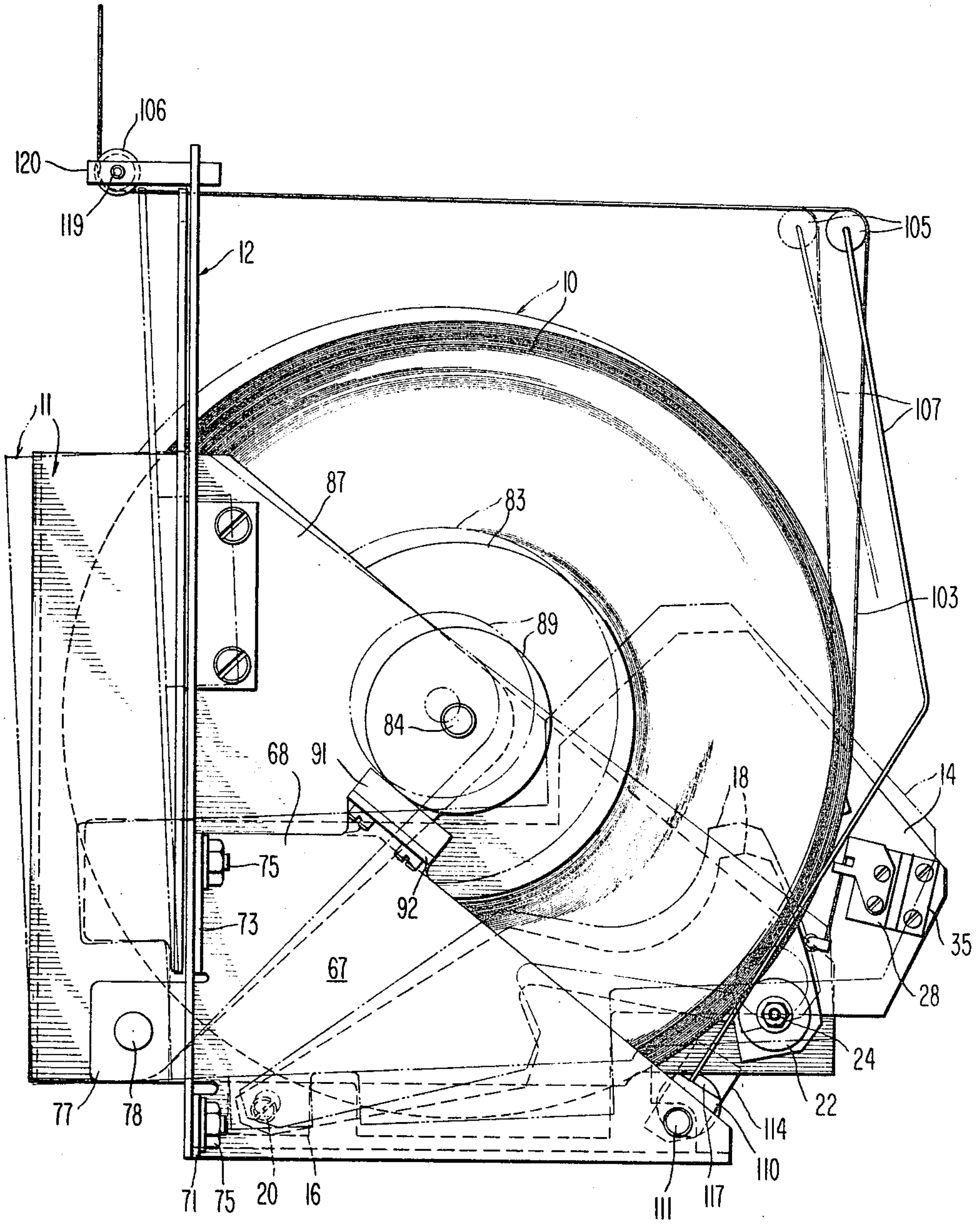
FIGURE 3 is a side elevational view as viewed from the plane containing line 3—3 of FIGURE 1.

Referring now to FIGURE 3, the free end 103 of the roll of tape 10 is shown extending tangentially upwardly from the right hand unwound portion of the roll to pass over roller 105 and then horizontally to roller 106. Roller 105 is supported for rotation by means of a generally inverted U-shaped wire frame 107, the roller being supported at the base of the U, indicated at 108, see FIGURE 1. The left leg 109 of the member is mounted upon the left side of block 110 which is affixed to shaft 111, the latter extending between flanges 68 and 69 of channel 67. The other leg 112 of the U-shaped wire frame includes a jog as at 113 and extends downwardly to mounting member 114 affixed upon the outer end of shaft 115. The inner end of the shaft is received within an eccentric cam portion 117 integral with block 110. Roller 106 as seen in the upper left hand portion of FIGURE 3, is supported forwardly of the front panel 12 by pivot 119 received in bracket 120 and the latter bracket is secured to the front panel by screws 121 as seen in FIGURE 1.

Still referring to FIGURE 3, it may be noted that roller 105 is normally in its full line position when the tape is under steady tension of a predetermined magnitude, by tape advance means not shown, as the wheel 89 engages friction block 91. In the event of a surge or increase in tension, the wire frame support 107 carrying roller 105 will flex to its dotted line position as shown. The tape support housing 11 may under these circumstances move forwardly also to its dotted line position as shown. Since the switch assemblies 26, 28, 30, 32 and 34 and the pivotal contact arm 18 are mounted on the movable chassis 11, as previously described, such movement therefore is not reflected as an error in the tape level sensing apparatus.

Referring now to FIGURE 4 of the drawings, there is shown an electrical circuit diagram incorporating the electrical switches 26, 28, 30, 32 and 34 which in the present embodiment of the invention are so located upon their mounting plate 14 to produce an electrical output in a manner hereinafter to be described to indicate the amount of tape contained on the reel at predetermined levels. For this purpose a manual multicontact selector switch 125 mounted upon the front stationary panel 12 is shown connected to indicator lights 127 and 129 by means of a source of power +V. The stepping switches 26, 28, 30, 32 and 34 are of the single pole, double throw construction with each having an arm 131 pivotally connected about one contact and swingable between a pair of opposed contacts. The contacts 132 to 136 inclusive are shown connected to contacts **26*a*, 28*a*, 30*a*, 32*a* and 34*a* respectively. Contacts 26*b*, 28*b*, 30*b*, 32*b* and 34*b* are connected to one side of indicator light 127 while the opposed contacts 26*c*, 28*c*, 30*c*, 32*c* and 34*c* are connected to one side of the other indicator light 129. Depending upon the supply of tape 10 on the reel a given switch or switches will be activated between either of two contacts. The switch settings as shown are those which exist with a full roll of tape and with the selector switch 125 in its "off" position. Thus, for example, if it is determined that a given tape utilizing operation will necessitate a given amount of tape, such as 800 feet, the operator may ascertain whether at least that amount is available. The operator may determine this even though the supply of tape is concealed from his view in that the same is enclosed in housing 11 which lies behind the front plate 12 of the cabinet or console. By turning the thumb screw arm 126 of selector switch 125, in a clockwise direction, from its "off" position to engage contact 133, current is enabled to flow through the stepping switch 125 and then through switch 28 in series therewith. It is observed that camming surface 51 of contact arm 18, FIGURE 2, is so positioned that switch arm 131 of switch assembly 28 connects contacts 28*a* and 28*b* as seen in the full line position of the switch arm. Due to the manual setting of the stepping switch 125 current is enabled to flow in series through it and through switch 28 to cause light 127 to glow, thereby indicating that an adequate supply of tape is available. However, as the supply of tape is diminished, the camming surface 51 will move upwardly in a manner to permit switch contact arm 131 to move and connect contacts 28*a* and 28*c*. With this setting of switch 28, current is enabled to flow through the other indicator lamp 129 to thereby indicate that the supply of tape on the reel has fallen below the 800 foot level. In a similar manner required tape levels may be checked by the operator by manually setting the selector switch 125 to other settings to observe which of the two visual indicators 127, 129 is activated. It is apparent however that the accuracy for a given footage level indication is a function of the tape reel itself. A change in the tension used in winding the tape reel as well as lack of roundness of the reel also affect the accuracy of the apparatus. In order to accommodate different thicknesses of tape the above-referred to switches may be readjusted relative to mounting plate 14**.

While there has been described what is at present considered to be the preferred embodiment of the invention, it will be obvious to those skilled in the art that various changes and modifications may be made therein without departing from the invention, and it is therefore aimed in the appended claims to cover all such changes and modifications as fall within the true spirit and scope of the invention.

What is claimed is:

1. In tape level sensing apparatus the combination comprising, a chassis having a reel of tape mounted thereon, said chassis mounted for pivotal movement to accommodate changes in tension of said tape, sensing arm means mounted on one leg of the chassis and having its free end normally in engagement with the periphery of said tape, biasing means normally urging the free end of said sensing arm means into engagement with said tape, said sensing arm means including a plurality of cam surfaces disposed on its periphery, a plurality of switch means mounted upon said chassis in opposed relation to said cam surfaces, signal means electrically connected to said switch means, each one of said cam surfaces engaging a different one of said switch means to produce successive electrical outputs to energize said signal means upon unreeling of the tape on said reel in predetermined amounts.

2. In tape level sensing apparatus the combination comprising, a chassis having a reel of tape mounted thereon, said chassis mounted for pivotal movement to accommodate changes in tension of said tape, sensing arm means mounted on one leg of the chassis and having its free end normally in engagement with the periphery of said tape, biasing means normally urging the free end of said sensing arm means into engagement with said tape, said sensing arms means including a plurality of cam surfaces disposed about its periphery, a plurality of switch means mounted upon said chassis in opposed relation to said cam surfaces for selective actuation thereby, first and second signal means connected to each of said switch means, and manual switch means selectively connectable with each of said switch means, whereby electrical connection of said manual switch means with one of said switch means which is actuated to one state by said sensing arm means is effective to cause said first signal means to be activated and upon movement of said sensing arm means to another position due to the unreeling of the tape, said switch means is actuated to another state by said sensing arm means to thereby enable said second signal means to be activated.

3. In tape level sensing apparatus, the combination comprising, a reel for carrying a spool of tape, a chassis for supporting said reel, means for pivotally supporting said chassis, sensing arm means pivotally mounted on said chassis for following the changes in dimension of the spool of tape, a plurality of switch devices mounted upon said chassis and disposed about the periphery of said sensing arm means, said switch devices being engageable by said sensing arm means, a selector switch connectable with each switch device, indicator means connected to each switch device and adapted to be energized for indicating the amount of tape on said reel at predetermined levels, and means for altering said selector switch to connect the same in series with a source of electrical energy and one of said switch devices to energize said indicator means.

4. A combination according to claim 3 wherein said indicator means includes first and second light means and each switch device is provided with first and second switch positions, said first light means being energized to indicate the amount of tape on said reel at certain levels when a connected switch device is in its first switch position, and said second light means being energized to indicate the amount of tape on said reel at another level when said connected switch device is engaged and actuated by said sensing arm means to its second switch position.

References Cited by the Examiner

UNITED STATES PATENTS

| | | | |
|---|---|---|---|
| 1,208,646 | 12/1916 | Power | 340—260 |
| 1,300,257 | 4/1919 | Felland | 340—260 |
| 1,542,808 | 6/1925 | Adams | 200—61.16 X |
| 1,869,678 | 8/1932 | Fenner | 200—61.16 |
| 2,161,273 | 6/1939 | Begun | 340—259 |
| 2,375,197 | 5/1945 | Clark | 340—259 |
| 2,584,734 | 2/1952 | Owens | 340—260 X |
| 2,968,284 | 1/1961 | Ellis. | |
| 3,062,997 | 11/1962 | Loyd. | |
| 3,081,958 | 3/1963 | Kegg | 340—259 X |

FOREIGN PATENTS

| | | |
|---|---|---|
| 809,372 | 7/1951 | Germany. |

NEIL C. READ, *Primary Examiner.*

R. GOLDMAN, *Assistant Examiner.*